(12) United States Patent
Stenstrom

(10) Patent No.: US 7,363,435 B1
(45) Date of Patent: Apr. 22, 2008

(54) SYSTEM AND METHOD FOR COHERENCE PREDICTION

(75) Inventor: Per O. Stenstrom, Gothenburg (SE)

(73) Assignee: Sun Microsystems, Inc., Santa Clara, CA (US)

( * ) Notice: Subject to any disclaimer, the term of this patent is extended or adjusted under 35 U.S.C. 154(b) by 541 days.

(21) Appl. No.: 11/116,028

(22) Filed: Apr. 27, 2005

(51) Int. Cl.
*G06F 12/00* (2006.01)
(52) U.S. Cl. .............. 711/147; 711/141; 711/144; 711/145; 711/156; 711/221
(58) Field of Classification Search ........... 711/147, 711/141, 144, 145, 156, 221
See application file for complete search history.

(56) References Cited

U.S. PATENT DOCUMENTS

| | | | |
|---|---|---|---|
| 6,704,842 B1* | 3/2004 | Janakiraman et al. | 711/141 |
| 6,820,174 B2 | 11/2004 | Vanderwiel | 711/141 |
| 6,857,051 B2 | 2/2005 | Sharma et al. | 711/145 |
| 6,868,481 B1 | 3/2005 | Gaither et al. | 711/119 |
| 6,874,053 B2 | 3/2005 | Yasuda et al. | 710/305 |
| 6,877,030 B2 | 4/2005 | Deneroff | 709/213 |
| 6,889,293 B1* | 5/2005 | Kaxiras et al. | 711/147 |
| 6,973,547 B2* | 12/2005 | Nilsson et al. | 711/141 |
| 2003/0154351 A1 | 8/2003 | Nilsson et al. | 711/141 |

OTHER PUBLICATIONS

"Using Prediction to Accelerate Coherence Protocols", Mukherjee, et al, *25th Annual International Symposium Computer Architecture*, ISCA '98, Barcelona, Jun. 27, 1998, pp. 179-190.
"Memory Sharing Predictor: The Key to a Speculartive Coherent DSM", Lai, et al, *Computer Architecture Ne* Association for Computing Machinery, New York, vol. 27, No. 2, May 1999, pp. 172-183.
"Selective, Accurate and Timely Self-Invalidation Using Last-Touch Prediction", Lai, et al, *Computer Architecture News*, Association for Computing Machinery, New York, vol. 28, No. 2, May 2000, pp. 139-1.
"Alternative Implementations of Two-Level Adaptive Branch Prediction", Yeh, et al, *Annual ACM Worksho Computational Learning Theory*, Aug. 27, 1992, pp. 124-134.
Abdel-Shafi, et al, "An Evaluation of Fine-Grain Producer-Initiated Communication in Cache-Coherent Multiprocessors", Proceedings of the 3rd IEEE Symposium on High-Performance Computer Architecture (HPCA San Antonio, TX, Feb. 1997.

(Continued)

*Primary Examiner*—Stephen C. Elmore
(74) *Attorney, Agent, or Firm*—Meyertons Hood Kivlin Kowert & Goetzel, P.C.; B. Noël Kivlin

(57) ABSTRACT

A coherence prediction mechanism includes a synchronization manager and a plurality of access predictors. The synchronization manager maintains one or more sequence entries, each sequence entry indicating a sequence in which a corresponding data block is accessed by two or more processing elements of a multiprocessor system. An access predictor provides a prediction to the synchronization manager identifying a next data block to be accessed by a corresponding processing element. In response to an indication of an access to a particular data block from a first processing element, the synchronization manager accesses a sequence entry corresponding to the particular data block and sends an identification of a next processing element expected to access the data block to the first processing element. The first processing element may use the identification to perform one or more speculative coherence actions.

25 Claims, 7 Drawing Sheets

OTHER PUBLICATIONS

Cox, et al, "Adaptive Cache Coherency for Detecting Migratory Shared Data", In *Proc. of the 20th Annual Int'l Symp. on Computer Architecture (ISCA'93)*, pp. 98-108, May 1993.

Grahn, et al, "Evaluation of a Competitive-Update Cache Coherence Protocol with Migratory Data Detection" *Journal of Parallel and Distributed Computing*, 39(2): 168-180, Dec. 1996.

Hill, et al, "Cooperative Shared Memory: Software and Hardware for Scalable Multiprocessors", *IEEE Trans Computer Systems*, 11(4): 300-318, Nov. 1993.

Kaxiras, "Identification and Optimization of Sharing Patterns for Scalable Shared-Memory Multiprocessors", Thesis, University of Wisconsin-Madison, 1998.

Kaxiras, et al, "Improving CC-NUMA Performance Using Instruction-Based Prediction", In Procedures of HP 5, pp. 161-170, Jan. 1999.

Kaxiras, et al, "Coherence Communication Prediction in Shared-Memory Multiprocessors", *In Proc. of HPCA* Jan. 2000.

Koufaty, et al, "Data Forwarding in Scalable Shared-Memory Multiprocessors", *IEEE Trans. on Parallel and Distributed Systems*, 7(12): 1250-1264, Dec. 1996.

Laudon, et al, "The SGI Origin: A CCNUMA Highly Scalable Server", *In Proc. of ISCA-24*, pp. 241-251, 1.

Lebeck, et al, Dynamic Self-Invalidation: Reducing Coherence Overhead in Shared Memory Multiprocessor *In Proc. of ISCA-22*, pp. 48-59, Jun. 1995.

Lenoski, et al, "The Directory-Based Cache Coherence Protocol for the DASH Multiprocessor", *In Proc. of IS 17*, pp. 148-159, May 1990.

Magnusson, et al, "SimICS/sun4m: A virtual Workstation", *In Proc. of Usenix Annual Technical Conf.*, Jun. 1998.

Skeppstedt, et al, Simple Compiler Algorithms to Reduce Ownership Overhead in Cache Coherence Protoco *In Proc. of ASPLOS-6*, pp. 325-337, 1994.

Stenstrom, et al, "An Adaptive Cache Coherence Protocol Optimized for Migratory Sharing", *In Proc. of ISC 20*, pp. 109-118, 1993.

Woo, et al, "The SPLASH-2 Programs: Characterization and Methodological Considerations", *In Proc. of ISC 22*, pp. 24-36, Jun. 1995.

\* cited by examiner

SYSTEM AND METHOD FOR COHERENCE PREDICTION

BACKGROUND OF THE INVENTION

1. Field of the Invention

This invention relates to the field of multiprocessor computer systems and, more particularly, to mechanisms for predicting coherency operations in multiprocessor computer systems.

2. Description of the Related Art

Modern computer systems, especially server systems dedicated to performing complex commercial and technical applications, are often configured as multiprocessors, where two or more processors may be employed to perform computing tasks. Components of a particular computing task may be distributed among multiple processors to decrease the time required to perform the computing task as a whole, and/or to increase transaction throughput for transaction-oriented applications. Alternatively, a particular computing task may be performed upon one processor while other processors perform unrelated computing tasks.

A number of different architectures have been implemented for multiprocessor computer systems, including symmetric multiprocessing and distributed shared memory architectures. A symmetric multiprocessor may comprise multiple processors connected through a cache hierarchy to a shared bus. A memory shared among the processors may be attached to the bus. In a distributed shared memory architecture, in contrast, the multiprocessor may comprise multiple nodes coupled by an interconnect, where each node includes one or more processors and memory. When considered as a whole, the memory included within the multiple nodes may form the shared memory for the computer system. Some recent multiprocessor systems may include multiple processing elements or cores within a single chip. Each processing element or core may be capable of supporting multiple threads of execution, and each processing element may be configured with its own cache or with multiple caches. In some implementations, a single multi-processing computer system may include multiple multi-core or multithreaded chips configured to cooperate to perform desired computing tasks.

In each of these architectures, copies of data residing at a particular main memory address may be stored in the caches of more than one processor or processing element. In order to maintain the shared memory model, in which a particular address stores exactly one data value at any given time, a cache coherency mechanism may be employed. Generally speaking, an operation may be said to be coherent if the effects of the operation upon data stored at a particular memory address are reflected in each copy of the data within the various caches of the multiprocessor system. For example, when data stored at a particular memory address is updated, copies of the previous data may have to be invalidated in various caches, and a subsequent access to the particular memory address may result in the updated copy being transferred from main memory to a processor's cache. A number of different coherency mechanisms may be employed in different architectures, such as snooping bus protocols or various directory-based protocols.

Unfortunately, access to a data block whose valid copy is currently stored in a remote cache (i.e. at a cache that is linked to a different processing element) may often be significantly slower than access to a locally cached data block. In addition, write operations may be affected strongly by coherency related performance effects. If a write operation is performed by a given processing element and the given processing element does not have permission to write to the targeted memory location and/or does not have the contents of the targeted memory location in its cache, one or more expensive coherency operations such as a cache-line upgrade, an invalidate, or a copy of the contents of the targeted location from another processing element or node may be required. In systems employing multi-core chips, such operations may be required to maintain coherency both within a given multi-core chip, as well as across multiple chips. Such coherency operations may potentially result in severe performance degradation, especially for certain kinds of applications that include relatively frequent and often predictable accesses to synchronization variables from multiple processors.

SUMMARY

Various embodiments of a system and method for coherence prediction are disclosed. According to a first embodiment, a coherence prediction mechanism for a multiprocessor computer system includes a synchronization manager and a plurality of access predictors, where each of the access predictors is associated with a corresponding processing element of the multiprocessor. A processing element may, for example, be a processor core within a multi-threaded processor chip, or a processor implemented using one or more chips. The synchronization manager may be configured to maintain one or more sequence entries, each sequence entry corresponding to a respective data block. The data blocks for which sequence entries are maintained may be a selected subset of the data blocks accessed by an application, for example a subset consisting of synchronization variables or other blocks whose accesses are expected to generate cache coherency operations. Each sequence entry may indicate a sequence in which the corresponding data block is accessed by two or more processing elements. An access predictor may be configured to provide a prediction to the synchronization manager identifying a next data block to be accessed by its corresponding processing element. The synchronization manager may be configured to use the predictions provided by access predictors to populate the sequence entries. In response to an indication of an access to a particular data block from a first processing element, the synchronization manager may look up a sequence entry corresponding to the particular data block, and may send an identification of a next processing element expected to access the data block to the first processing element. The identification may be used by the first processing element to perform one or more speculative coherence actions, such as sending the updated contents of the data block to the cache of the next processing element, thereby potentially avoiding expensive coherence misses and upgrades.

According to some embodiments, each access predictor may maintain a history entry list and a pattern table. The history entry list may indicate a sequence in which selected data blocks have been accessed by the processing element associated with the access predictor. Contents of the history entry list may be used, e.g., via a hash function or other mapping, to access an entry of the pattern table that identifies a selected data block that may be accessed next by the processing element. The identifier for the selected data block predicted to be accessed next by the processing element may be sent to the synchronization manager by the access predictor.

According to one embodiment, a system may include a plurality of processing elements, a synchronization manager and a plurality of access predictors, including a first access predictor associated with a first processing element. The synchronization manager may be configured to maintain one or more sequence entries, each sequence entry corresponding to a respective selected data block. Each sequence entry may indicate a sequence in which the corresponding data block is accessed by two or more processing elements. The first access predictor may be configured to provide a prediction to the synchronization manager identifying a next data block to be accessed by the first processing element. The synchronization manager may be configured to insert an entry identifying the first processing element into a sequence entry for the next data block. In response to an indication of an access to a particular data block from a first processing element, the synchronization manager may look up a sequence entry corresponding to the particular data block, and send an identification of a next processing element expected to access the data block (or a request for a specific speculative coherence action) to the first processing element. The first processing element may then perform one or more speculative coherence actions, such as sending the updated contents of the data block to the cache of the next processing element.

Figure 1:
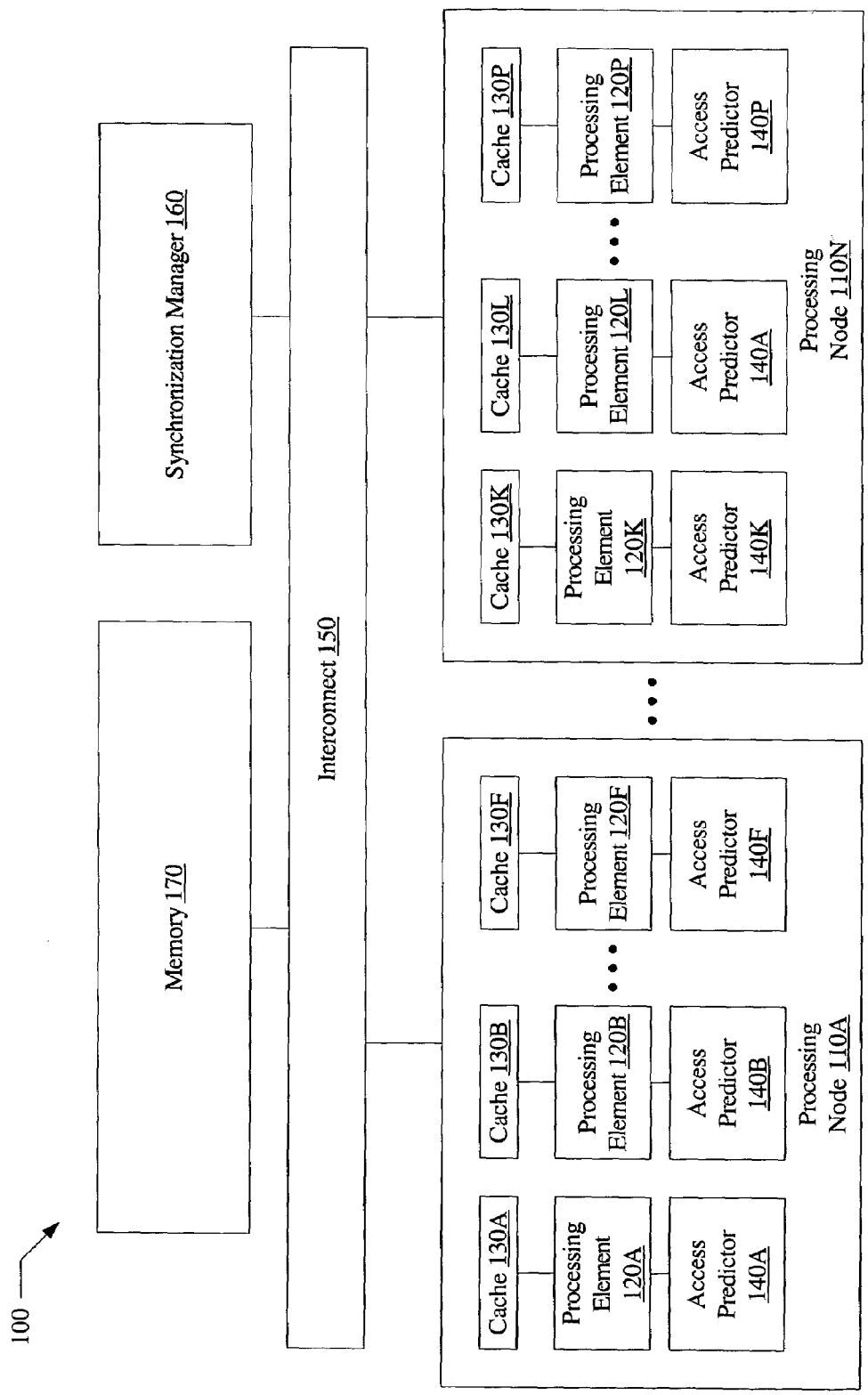
FIG. 1 is a block diagram of one embodiment of a multiprocessor computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram of one embodiment of a multiprocessor computing system 100. The multiprocessor computing system includes a plurality of processing nodes 110A-10N coupled via interconnect 150 to memory 170 and to a synchronization manager 160. Each processing node 110 may include one or more processing elements 120, such as processing elements 120A-120 F in processing node 110A and processing elements 120K-120P in processing node 110N. Each processing element 110 may be coupled to a cache 130; e.g., cache 130A is coupled to processing element 120A, cache 130B to processing element 120B, etc. In addition, each processing element may be coupled to one or more associated access predictors 140; e.g., in the embodiment of FIG. 1, access predictor 140A is coupled to processing element 120A, access predictor 140B to processing element 120B, and so on. Further details about the structure and functionality of access predictors 140 and synchronization manager 160 are provided below.

In one embodiment, each processing node 110 may comprise one or more single-chip processors—for example, each processing element 120 may be a processor that is implemented on a separate chip. In other embodiments, where, for example, each processing node 110 represents a single multi-core processor chip, each processing element 120 may represent a different processor core. In another embodiment, each processing node 105 may comprise a plurality of multi-core processor chips. In one specific embodiment, multiple access predictors 140 may be associated with a given multi-threaded processor core, with one access predictor 140 corresponding to each thread of execution. The processing elements 120 may be implemented according to any of a variety of processor architectures in different embodiments. For example, in one embodiment, the processing elements may conform to a version of the Sparc™ architecture from Sun Microsystems, while in another embodiment, the processing elements may conform to a version of the Power™ architecture from the International Business Machines Corporation or an x86-compatible architecture from Intel Corporation.

In some implementations, processing elements 120 may include internal Level 1 (L1) instruction and/or data caches, and caches 130 may include Level 2 (L2) caches. If processing elements 120 do not include internal caches, caches 130 may represent Level 1 caches. In some embodiments, each processing element 120 may be associated with a cache hierarchy including multiple levels of external caches 130. Caches 130 may be configured in any of a variety of specific cache arrangements. For example, set-associative or direct-mapped configurations may be employed.

Interconnect 150 accommodates communication between processing nodes 110, memory 170 and synchronization manager 160. In some embodiments, interconnect 150 may also facilitate communication between processing nodes 110, memory 170 and one or more I/O interfaces (not shown in FIG. 1). In one embodiment, interconnect 150 may include an address bus and related control signals, as well as a data bus and related control signals. Because the address and data buses are separate, a split-transaction bus protocol may be employed upon interconnect 150. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

In alternative embodiments, interconnect 150 may be implemented as a circuit-switched network or a packet-switched network. In embodiments where interconnect 150 is a packet-switched network, packets may be sent through the data network using techniques such as wormhole, store and forward, or virtual cut-through. In a circuit-switched network, a particular device may communicate directly with a second device via a dedicated point-to-point link that may be established through a switched interconnect mechanism. To communicate with a different device, a different link is established through the switched interconnect. In some embodiments, separate address and data networks may be employed.

Memory 170 stores data and instruction code for use by processing elements 120. Memory 170 may comprise one or more modules of any type of memory, such as various versions of dynamic random access memory (DRAM). In some embodiments, multiple memories 170 may be employed in a distributed shared memory configuration, where each memory is associated with a particular processing node 110. Each address in the address space of the distributed shared memory may be assigned to a particular processing node 110, referred to as the home node of the address. A processing element 120 within a different processing node 110 than the home node may access the data at an address of the home node, potentially caching the data.

In general, since a given data block may be cached in multiple caches 130 within multiprocessor system 100, coherency may have to be maintained across processing nodes 110 as well as among the processing elements 120 and caches 130 within a particular processing node 110. In chip-multithreaded systems where a given processing node includes one or more chips with multiple processor cores, for example, coherency has to be maintained both inside a given multi-core chip and between different chips.

A number of different types of coherency protocols may be used to maintain coherency in different embodiments. Coherency protocols typically maintain state information associated with each cached data block. When certain types of memory operations are performed at a given cache 130, state information associated with corresponding data blocks may be modified, and effects of the change of state and/or the modified contents of the data blocks may be propagated to other caches in the system.

For example, in a class of coherency protocols called "write-invalidate" protocols, two types of performance-critical coherence operations, upgrades and coherence misses, may be employed to maintain cache coherency. An upgrade operation may comprise changing or "upgrading" the state of a data block that is present in a cache 130, e.g., to an exclusive state, when the corresponding processing element 120 modifies the block, and sending out invalidation messages to other caches in the system that may potentially also have a copy of the data block. Each cache 130 that receives an invalidation message for the data block and contains a copy of the data block changes the state of its copy to an "invalid" state. In some implementations, invalidation messages may sometimes take the equivalent of hundreds or thousands of processor cycles, depending on whether the targeted caches are within the same processing node 110 as the originating cache 130, or on a different processing node. When a given processing element 120 attempts to read a data block from its cache 130, and finds that the data block has been invalidated as a result of a previous upgrade operation, a coherence miss is said to have occurred. In order to handle the coherence miss, a valid copy of the data block may have to be located at another cache 130 or in memory 170, and copied from the other cache or from memory into the cache of the processing element attempting to access the data block.

In some embodiments, processing elements 120 may have to stall or wait for at least part of the time that may be taken to complete the upgrade-related and coherence miss-related operations before continuing execution of pending instructions. Together, upgrades and coherence misses may often account for a significant portion of stall time (i.e., the total time that processing elements 120 spend in a stalled state instead of executing instructions) for many important throughput-oriented multi-threaded applications, such as transaction processing and scientific/engineering workloads. Systems that employ other coherency protocols may also suffer from similar effects due to inter-cache coherency related operations.

In many multi-threaded applications, the accesses to a small fraction of the set of data blocks accessed during execution may account for a disproportionately large fraction of coherency-related operations. That is, the distribution of coherency-related operations over the range of memory addresses accessed may not be uniform, and some data blocks may cause more coherency-related operations than others. For example, in many applications that use locks to synchronize accesses to shared data, such as database transaction processing applications, accesses and updates to the data blocks modified after obtaining the locks (as well as the data blocks associated with the locks themselves) may result in more frequent and/or more expensive coherence operations, on average, than accesses to other data blocks. Such synchronized accesses may be referred to as "critical sections". Generally speaking, a critical section is a segment of software code of a multi-threaded or multi-process program that includes accesses to potentially shared data blocks, but requires that only a single thread or process accesses the data blocks during the execution of the segment.

For many applications, it may be possible to manually or automatically identify the critical sections, or to otherwise identify the subset of data blocks (which may or may not be associated with critical sections) whose accesses may result in more frequent coherency related operations. For example, in one embodiment, data blocks on which read-modify-write operations (e.g., test and set, swap, etc.) are performed may be identified as the data blocks likely to require coherency operations. Such data blocks may be identified automatically when atomic read-modify-write instructions are encountered during execution, e.g., by tapping dedicated signals in a memory bus interface. In another embodiment, a compiler may be configured to automatically identify synchronization variables and other data blocks that may potentially cause extensive coherency operations. An application program may be compiled, e.g. with one or more special compilation flags, to instrument the executable code to mark accesses to the selected data blocks. In other embodiments, the executable or binary versions of application programs may be post-processed after compilation to identify critical sections and/or synchronization variables. In one embodiment, it may be possible for programmers to indicate critical section boundaries and/or to identify shared variables with a high likelihood of causing coherence operations during application development, e.g., using compiler directives or pragmas.

The sequence in which such selected data blocks may be accessed at processing elements 120 may be highly repeatable in many multi-threaded applications, and hence may be predictable. The following pseudo-code illustrates a simple example of code within a multi-threaded application that may result in frequent upgrades and coherence misses in multiprocessor systems employing write-invalidate protocols:

```
while (some_condition){
LOCK; // start first critical section
variable_A = variable_A + some_quantity; // modify
    variable_A
UNLOCK; // end first critical section
LOCK; // start second critical section
variable_B = variable_B - some_other_quantity; //
    modify variable_B
UNLOCK; // end second critical section
} // end while
```

In a multiprocessor system, multiple processing elements 120 may execute the first critical section followed by the second critical section as shown in the above pseudo-code, and the executions of the two critical sections at a given processing element may occur in a predictable sequence with respect to other processing elements 120. If a write-invalidate coherency protocol as described above is employed, when a particular processing element 120 enters a given critical section, it may experience a coherence miss followed by an upgrade. The coherence miss may occur because the data block corresponding to the variable to be modified in the critical section (e.g., "variable_A" in the first critical section of the example) is in an exclusive state in a cache 130 at a different processing element 120, where the corresponding critical section was most recently executed. After the copy of the data block is loaded into the local cache 130, an upgrade may be performed to move the data block into an exclusive state prior to a modification of the data block contents.

Figure 2:
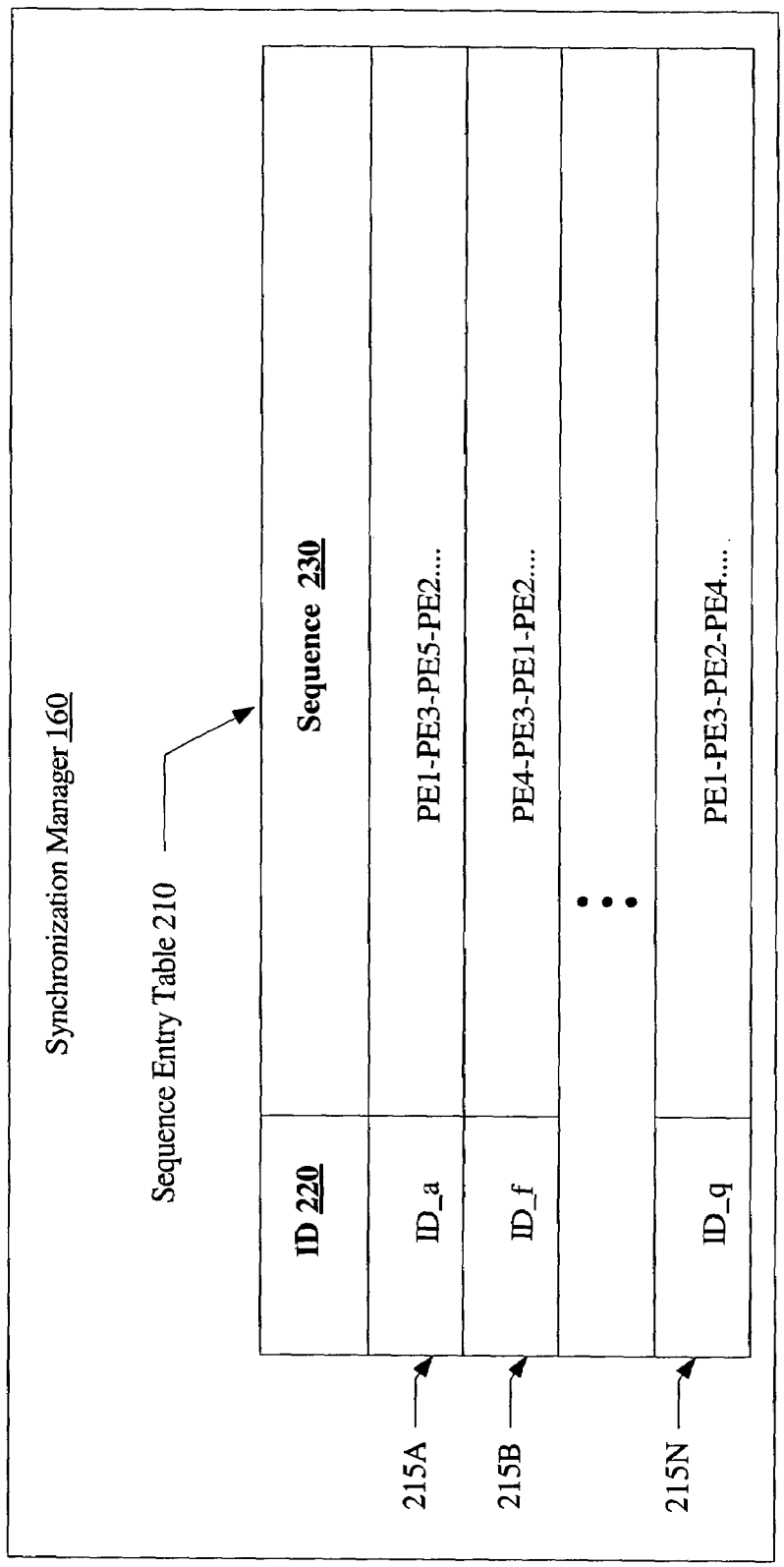
FIG. 2 is a block diagram illustrating an exemplary sequence entry table that may be incorporated within a synchronization manager, according to one embodiment.

Synchronization manager 160 and access predictors 140 may be configured to use the predictability of accesses to selected data blocks to reduce coherency-related overhead in some embodiments, as described below in further detail. Synchronization manager 160 may store predicted access sequences for selected data blocks within a sequence entry table. FIG. 2 is a block diagram illustrating an exemplary sequence entry table 210 that may be incorporated within a synchronization manager, according to one embodiment. As shown, sequence entry table 210 may comprise a plurality of sequence entries 215, such as sequence entries 215A, 215B, . . . 215N. Each sequence entry includes a field for an identifier (ID 220) of a selected data block, and a sequence 230 in which processing elements 120 are predicted to access the selected data block. For example, in the illustrated example, a sequence of predicted accesses to a data block with an identifier "ID_a" includes processing element PE1, followed by processing element PE3, followed in turn by processing element PE5 and then by processing element PE2. Similarly, a predicted sequence for a data block with an identifier "ID_f" includes processing element PE4 followed by processing elements PE3, PE1 and PE2, and a predicted sequence for a data block with identifier "ID_q" includes processing element PE1, followed in sequence by processing elements PE3, PE2 and PE4.

Sequence entries 215 may be populated by synchronization manager 160 in accordance with predictions provided to the synchronization manager by access predictors 140, as described below in further detail. For example, in one embodiment, if an access predictor 140A associated with processing element 120A predicts that the next data block (among a set of selected data blocks associated with likely coherence operations) to be accessed by processing element 120A is data block D1, synchronization manager 160 may insert an entry identifying processing element 120A into a sequence entry 215 for data block D1. In some embodiments, synchronization manager 160 may maintain each sequence entry as a FIFO (First-In-First-Out) buffer. In such embodiments, when a new prediction is received from an access predictor 140, an entry for the corresponding processing element may be inserted at the end of the FIFO buffer.

As described below in further detail, in response to an indication of an access to a given data block from a first processing element 120, synchronization manager 160 may use a sequence entry 215 corresponding to the given data block to identify the next processing element expected to access the block. (The indication of the access may be explicitly provided to synchronization manager 160 by the processing element 120 in some embodiments, e.g., in a message, or may be automatically detected by synchronization manager 160, e.g., by monitoring an address bus.) Synchronization manager 160 may then send an identifier for the next processing element to the first processing element. In response to the notification, the first processing element may initiate speculative coherence actions, such as sending the updated contents of the data block to the cache 130 of the next processing element. The actions may be termed "speculative" in that they may include providing a data block at a cache before the processing element associated with the cache begins execution of an instruction requiring access to the data block.

In embodiments employing FIFO buffers for sequence entries, an entry corresponding to the next processing element may be removed from the head of the FIFO buffer when the synchronization manager sends the identification of the next processing element to the first processing element. The FIFO buffers may store a limited number of processing element entries in some embodiments. In one such embodiment, if a new prediction is received when the targeted FIFO buffer already includes as many processing element entries as it can store, the new prediction entry may be stored within a special "extended" entry, and a pointer to the extended entry may be stored within the original targeted FIFO buffer. It is noted that implementations other than FIFO buffers may be employed for sequence entries 215 in some embodiments.

The contents of the ID field 220 of a sequence entry 215 for a given data block may be generated using a variety of techniques in different embodiments. For example, in one embodiment, the address of the data block (e.g., the physical address, or a virtual address) may be used as the ID. However, depending on the processor architecture and implementation, addresses may often require more bits (e.g., 32, 64 or 128 bits) than may be needed to represent the relatively small number of data blocks within an application's address space whose accesses may require frequent coherency operations. For example, if the number of selected data blocks for which sequence entries 215 are to be maintained is typically expected to be a few hundred or a thousand for most applications, a 10-bit encoding (which may be used to represent up to 1024 unique data blocks) may be sufficient. Synchronization manager 160 may be configured to generate IDs for data blocks of interest, and to maintain a mapping between the addresses of the data blocks and their encoded IDs in some embodiments. In other embodiments, IDs may be generated within processing elements 105 (e.g., by one or more access predictors 140). Part or all of a mapping between data block addresses and IDs may be maintained and/or replicated at multiple processing nodes 105 in some embodiments. Sequence entry table 210 may be indexed using data block addresses in one embodiment. In the following description, data blocks may be referred to using their identifiers: for example, the phrase "data block ID_a" or the term "ID_a" may be used synonymously with the phrase "the data block with identifier ID_a".

Processing elements 120 may be identified within the sequence fields 230 of sequence entries 215 using numerical identifiers in some embodiments—for example, an 8-bit encoding may be used to identify up to 256 unique processing elements. The size of each sequence entry 215 may be determined by several factors, such as the encoding (if any) used to derive IDs from data block addresses, the maximum number of processing element identifiers stored within sequence 230 (e.g., the maximum number of entries in a FIFO buffer used for the sequence) and the number of processing elements 120 in the multiprocessor.

Figure 3A:
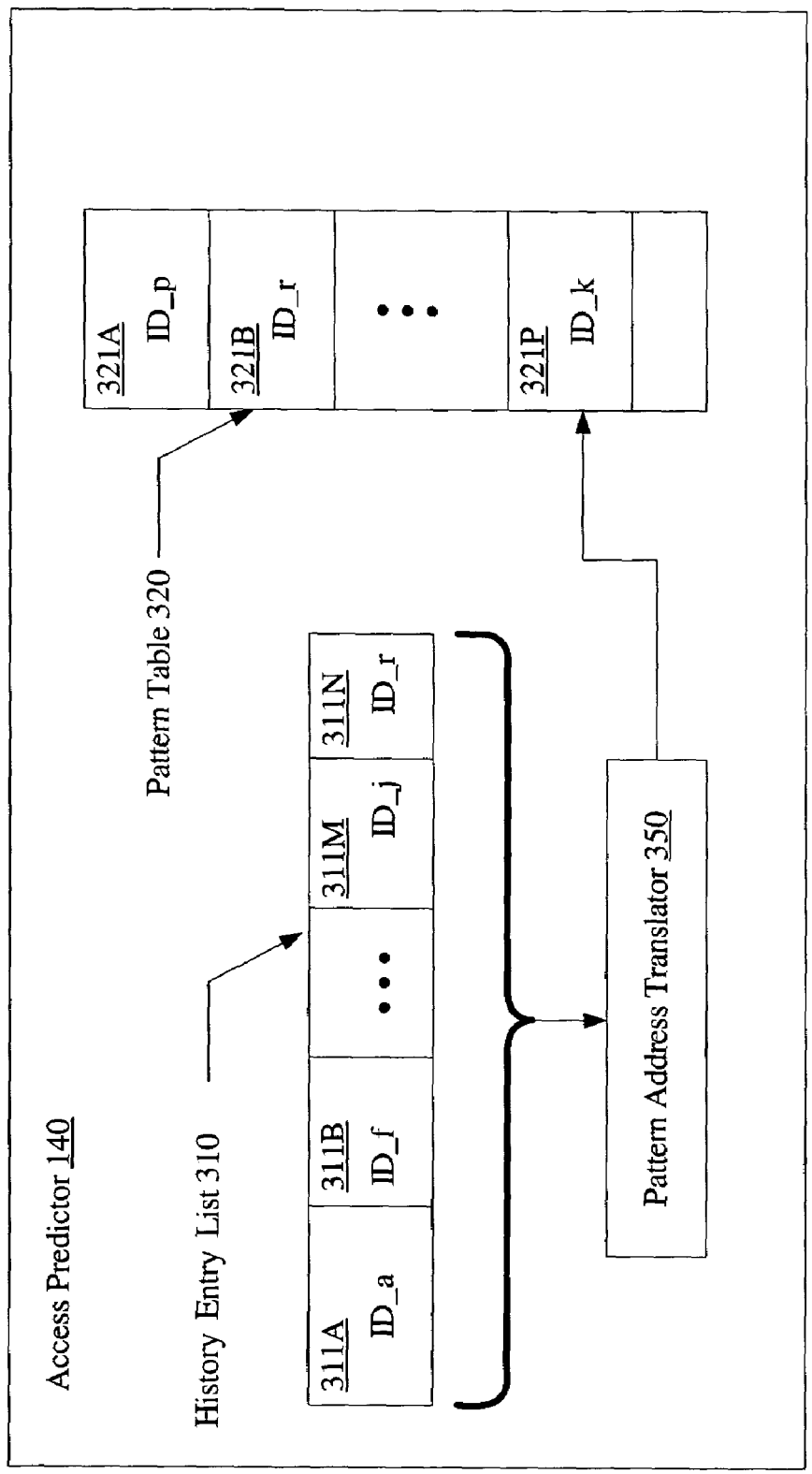
FIG. 3a is a block diagram of an exemplary access predictor, according to one embodiment.

FIG. 3a is a block diagram of an exemplary access predictor 140, according to one embodiment. Access predictor 140 may include a history entry list 310 (which may also be termed a history register) a pattern table 320, and a pattern address translator 350. History entry list 310 may include several history entries 311 (e.g., 311A . . . 311N) which collectively indicate a sequence in which the processing element 120 corresponding to the access predictor 140 accesses selected data blocks. That is, each history entry list 310 may indicate an order in which selected data blocks were accessed by a particular processing element 120 or execution thread. As described below in further detail, a prediction of the specific next selected data block to be accessed by the processing element 120 may be made using the sequence of accesses stored in the corresponding history entry list 310 in some embodiments. In the example illustrated in FIG. 3a, the history entry list 310 indicates that the processing element accessed data block ID_a before accessing data block ID_f, and data block ID_j before accessing data block ID_r. History entry list 310 may also be maintained as a FIFO buffer with a designated fixed number of entries in some embodiments. Initially, history entry list 310 may be empty. When processing element 120 accesses a selected data block that has been identified (e.g., using one of the techniques described earlier) as likely to cause frequent coherency operations, access predictor 140 may add a history entry 311 for the data block to the history entry list 310.

Figure 3B:
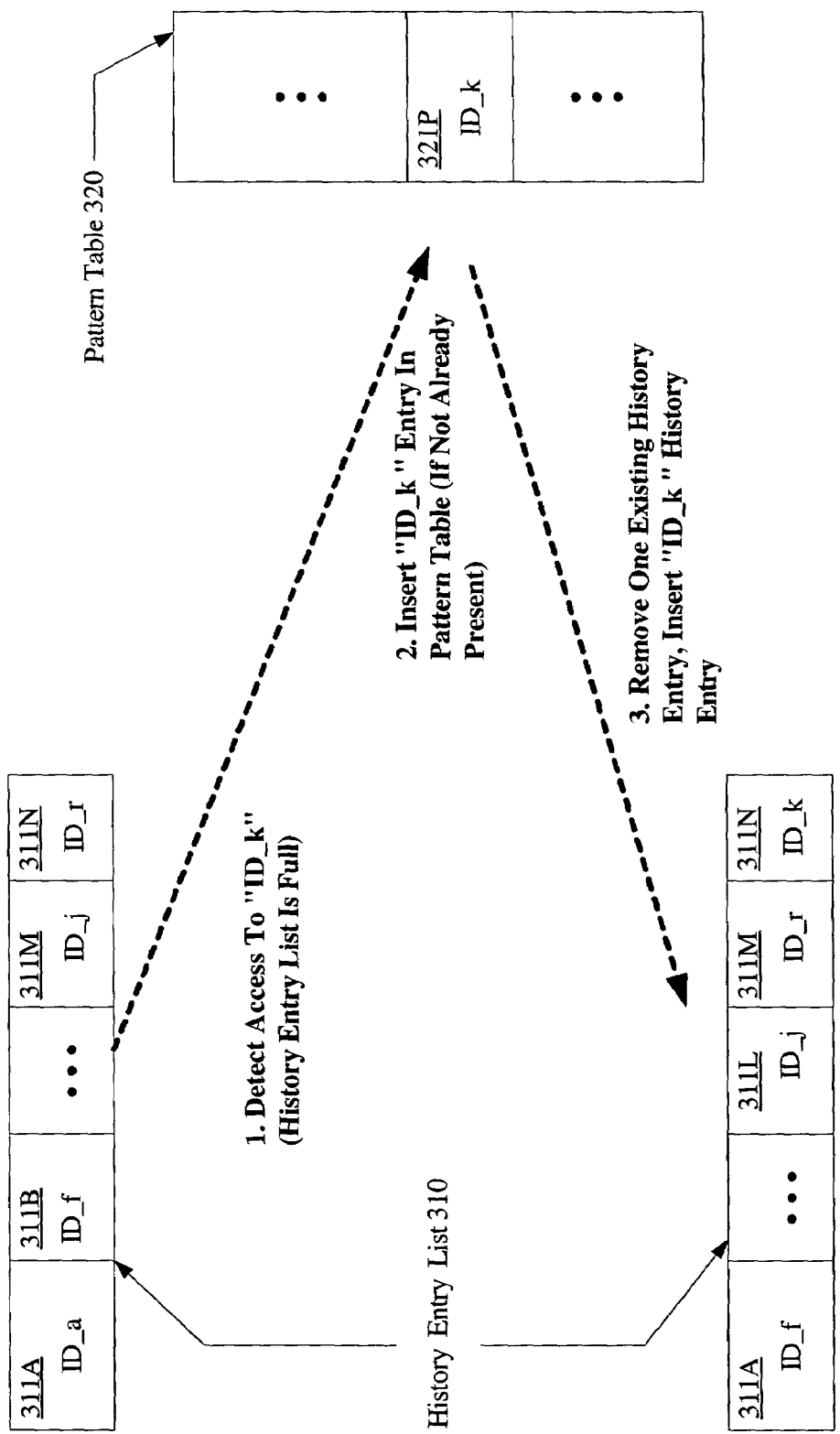
FIG. 3b is a block diagram illustrating aspects of the operation of an access predictor, according to one embodiment.

When the history entry list is filled 310, the next access to a selected data block may be recorded within the pattern table 320, as indicated in FIG. 3b. Pattern table 320 may include a plurality of entries, each of which may include a prediction for a next selected data block that will be accessed by the processing element 120, based on the current contents of the history entry list 310. The particular entry 321 of the pattern table into which the next access is recorded may be selected using an index derived from the current contents of the history entry list 310. In some embodiments, pattern address translator 350 may be used to map the contents of one or more history entries 311, e.g., via a hashing function, to an entry 321 of the pattern table 320. Pattern address translators may be omitted in other embodiments. As shown in the example illustrated in FIG. 3b, when an access to a selected data block ID_k is detected and the history entry list is full (as indicated by the label "1"), ID_k may be written to pattern table entry 321P (as indicated by the label "2"), if such an entry does not already exist based on previous accesses. Thus, in the illustrated example, the contents of the pattern table entry 321P indicate that, after the sequence of accesses depicted in history entry list 310 (i.e., a sequence including data blocks ID_a, ID_f, . . . , ID_j, ID_r), the processing element is next going to access the selected data block ID_k. If and when the exemplary sequence of accesses shown in the history table 310 is repeated, access predictor may predict that the next selected data block to be accessed is data block ID_k, and provide an indication of the prediction to synchronization manager 160. In addition, e.g., in an embodiment where history entry list 310 is maintained as a FIFO buffer, when the access to the data block ID_k is encountered and the buffer is full, the entry at the head of the FIFO buffer may be removed and a new entry for ID_k may be added at the tail. Thus, in the depicted example, the history entry containing ID_a may be removed from history entry list 310, access predictor 140 may left-shift the contents of the history entries 311 within the history entry list 310, and may insert a history entry 311 for ID_k into history entry list 310, as indicated by the arrow labeled "3" in FIG. 3b. It is noted that history entry list 310 may be implemented using a variety of structures other than FIFO buffers in various embodiments.

In general, the accuracy of the prediction provided by indexing into pattern table 320 as described above may be a function of the number of history entries 311 maintained within history entry list 310 and the inherent repeatability of accesses in the multi-threaded application. In some embodiments, the addresses of the selected data blocks may be stored in history table entries 311 (and/or in pattern table 320) rather than the IDs. However, for similar reasons as those discussed above in conjunction with the description of FIG. 2, it may be possible to reduce the total size of history entry lists 310 (and pattern tables 320) by mapping addresses to shorter identifiers and storing the identifiers instead of full addresses within the history table entries 311 and pattern table entries 321. In implementations where multiprocessor system 100 includes a large number of processing elements 120 (and particularly in embodiments where multiple access predictors 140 may be associated with each processing element 120, e.g., one access predictor for each thread of execution of a multi-threaded processor core), the total amount of circuitry devoted to storing history table entries 310 and pattern table entries 321 may be reduced significantly by using short IDs instead of full addresses.

Figure 4A:
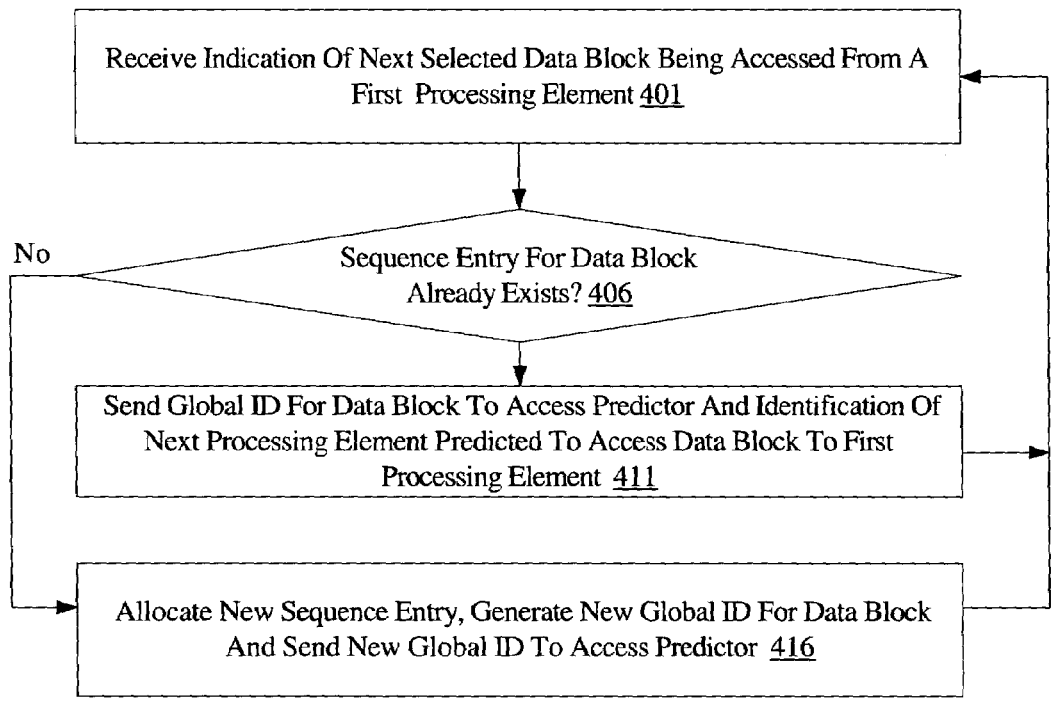
FIGS. 4a and 4b are flow diagrams illustrating aspects of the operation of a synchronization manager, according to one embodiment.
Figure 4B:
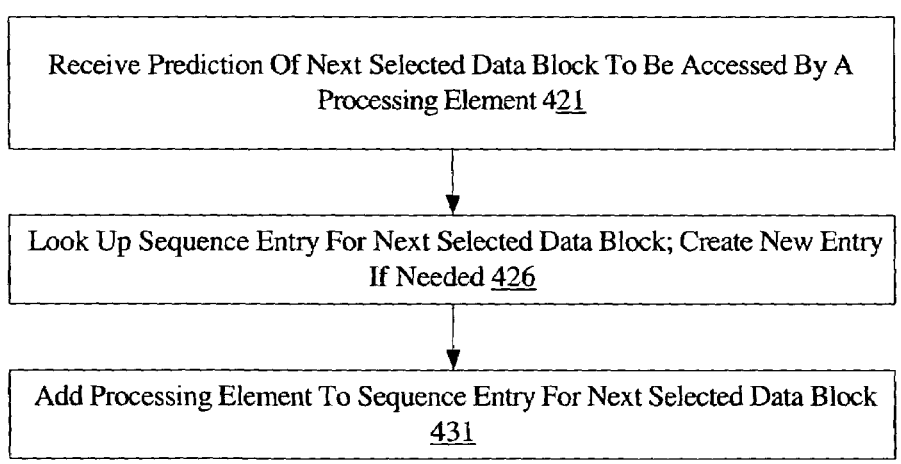

FIGS. 4a and 4b are flow diagrams illustrating aspects of the operation of synchronization manager 160, according to one embodiment. As described earlier, selected data blocks considered likely to result in frequent coherence operations may be identified using a variety of techniques in different embodiments, such as via automatic detection of atomic read-modify-write operations. On receiving an indication of an access to a next data block from among the selected data blocks by a first processing element (for example, via a message sent by the first processing element 120 or an access predictor 140 containing the address of the data block, or by monitoring an address bus), as illustrated in block 401 of FIG. 4a, synchronization manager 160 may be configured to check whether a sequence entry 215 for the data block already exists in sequence entry table 210 (decision block 406 of FIG. 4a). For example, in one embodiment, synchronization manager 160 may use part or all of the address of the data block, either directly or indirectly via a function such as a hash function, as an index into sequence entry table 210. If no sequence entry is found, synchronization manager 160 may allocate or create a new sequence entry 215 (with an empty sequence 230) for the data block (block 416 of FIG. 4a). In addition, synchronization manager 160 may generate a new globally unique identifier for the data block (i.e. an identifier that is unique within the multiprocessor system), and send the identifier to the first processing element 120 and/or access predictor 140. In one embodiment, the unique identifier may be generated using a mapping between the address and a shorter bit sequence, as described earlier. If a sequence entry 215 for the data block is found (block 411), synchronization manager 160 may send the identifier stored in the sequence entry 215 to the processing element 120.

If the sequence 230 stored in the existing sequence entry 215 indicates that a different processing element is going to access the data block next, synchronization manager 160 may also send an identification of the different processing element to the first processing element. On receiving the identification of the next processing element, the first processing element may initiate a speculative coherence action or actions as described below in further detail. It is noted that in some embodiments, instead of sending an identification of the next processing element expected to access the selected data block, synchronization manager 160 may send a request for one or more specific speculative coherence actions to the first processing element. After sending the identifier (or after requesting the speculative coherence actions), synchronization manager 160 may wait until an indication of the next access to a selected data block is received, and then repeat the operations illustrated in FIG. 4a starting with the operations associated with block 401. It is noted that in some embodiments, some of the operations illustrated in FIG. 4a may be omitted. For example, in embodiments where a portion or all of a mapping between data block addresses and globally unique identifiers is maintained or cached at each processing node 110, some of the illustrated operations related to generating new globally unique identifiers may not be performed by synchronization manager 160.

The first processing element may be configured to initiate a number of different types of speculative coherence actions in different embodiments. In the example illustrated in FIG. 2, if processing element PE1 is currently accessing data block ID_a, synchronization manager 160 may predict that that data block ID_a will be accessed next by processing element PE3. In response to the prediction of PE3's access, processing element PE1 may send the updated contents of data block ID_a (and/or other data blocks modified by PE1 within a critical section associated with data block ID_a) to the cache 130 attached to processing element PE3. In other embodiments, where, for example, the selected data block ID_a is identified with a corresponding critical section, processing element PE1 may flush all data blocks modified during the critical section to PE3's cache at the end of the critical section. In one embodiment, PE1 may flush data blocks modified during the current critical section to PE3's cache when PE1 enters its next critical section. As noted above, in some embodiments, synchronization manager 160 may be configured to send requests identifying the specific speculative coherence actions to be taken by PE1, instead of, for example, simply sending an identification of PE3.

A transfer of data blocks to the cache of the next processing element predicted to access the data blocks as described above may help to reduce the likelihood that upgrades and coherence misses will occur, and may therefore help to improve overall performance for the multi-threaded applications being supported in some embodiments (e.g., by reducing stall time). Since the updated blocks are transferred to a single processing element's cache rather than to caches at multiple processing elements as in some traditional update-based coherency protocols, some of the well-known problems of traditional update-based protocols (such as excessive utilization of interconnects) may be avoided.

In addition to sending an identification of a next processing element expected to access a data block, in some embodiments synchronization manager 160 may also remove an entry from the sequence 230 in the sequence entry 215 corresponding to the data block under consideration. For example, continuing the example illustrated in FIG. 2, after a notification identifying PE3 as the next processing element expected to access ID_a is sent to PE1, PE1 may be removed from sequence 230 of sequence entry 215A. Thus, when the next access to data block ID_a occurs (e.g., at PE3 as predicted), synchronization manager 160 may initiate another speculative coherence action based on a next predicted access to data block ID_a from processing element PE5. It is noted that the exact sequence in which a prediction is sent from synchronization manager 160, and a corresponding entry from a sequence 230 is removed, may differ in different implementations. It is also noted that in some cases, where for example a sequence 230 includes successive repetitions of the same processing element (e.g., PE2-PE2-PE2, indicating that the data block is accessed three times in succession by the PE2), speculative coherence actions may not be initiated for each prediction in one embodiment, even though an entry may be removed from the sequence 230 after each prediction.

The amount of data that is identified by or associated with an ID field 220, and therefore the amount of data for which speculative coherence actions may be performed based on a given sequence entry 215, may vary in different embodiments. In some embodiments, the ID field 220 may identify the contents of a single cache line. In other embodiments, an ID field 220 may represent a larger block of data, such as a page of data. In some implementations, where for example a sequence entry 215 corresponds to a critical section in which more than one synchronization variable may be modified, the ID field 220 may serve as a proxy or alias for a plurality of data blocks—that is, the speculative coherence actions that may be taken in response to a prediction based on a single sequence entry 215 may apply to multiple data blocks.

FIG. 4b is a flow diagram illustrating aspects of the operation of synchronization manager 160 in response to a prediction provided by an access predictor 140, according to one embodiment. On receiving a prediction of the next block to be accessed by a given processing element 120 (block 421 of FIG. 4b), synchronization manager 160 may look up the sequence entry 215 for the next block, and may create a new sequence entry if an existing entry is not found (block 426). Synchronization manager 160 may then add an identification of the particular processing element 120 to the sequence field 230 for the sequence entry (block 431).

Figure 5A:
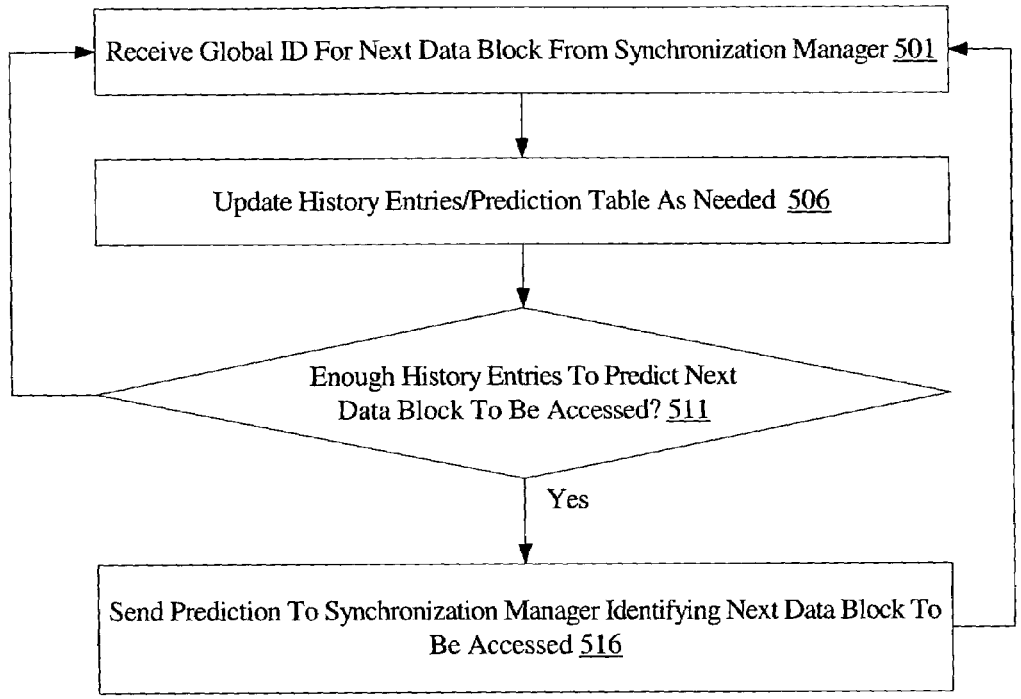
FIG. 5a is a flow diagram illustrating aspects of the operation of an access predictor, according to one embodiment.

FIG. 5a is a flow diagram illustrating aspects of the operation of an access predictor 140, according to one embodiment. An access predictor 140 may receive a globally unique identifier for the next data block being accessed by a corresponding processing element 120 (block 501 of FIG. 5a) (e.g., as a result of operations performed at the synchronization manager 160 illustrated in blocks 411 or 416). On receiving the identifier, the access predictor 140 may insert the identifier in history entry list 310 and/or in pattern table 320 (block 506). As described earlier, if the history entry list 310 is full, a history entry 311 (e.g., the "oldest" entry in a FIFO implementation of history entry list 310) may have to be removed from the existing history entry list in order to insert the identifier. If enough history entries 311 exist (e.g., if history entry list 310 is full) (as detected in decision block 511 of FIG. 5a), access predictor may look up an entry 321 corresponding to the history entry list 310 in pattern table 320, e.g., using pattern address translator 350 to index into pattern table 320. In some embodiments, contents of a subset of entries 311, rather than all entries within history entry list 310, may be used to look up a pattern table entry 321. If a pattern table entry 321 identifying the next selected data block predicted to be accessed by the processing element 120 is found, the prediction may be communicated to the synchronization manager 160 (block 516). On receiving the prediction, synchronization manager 160 may perform actions corresponding to FIG. 4b, as described above.

Figure 5B:
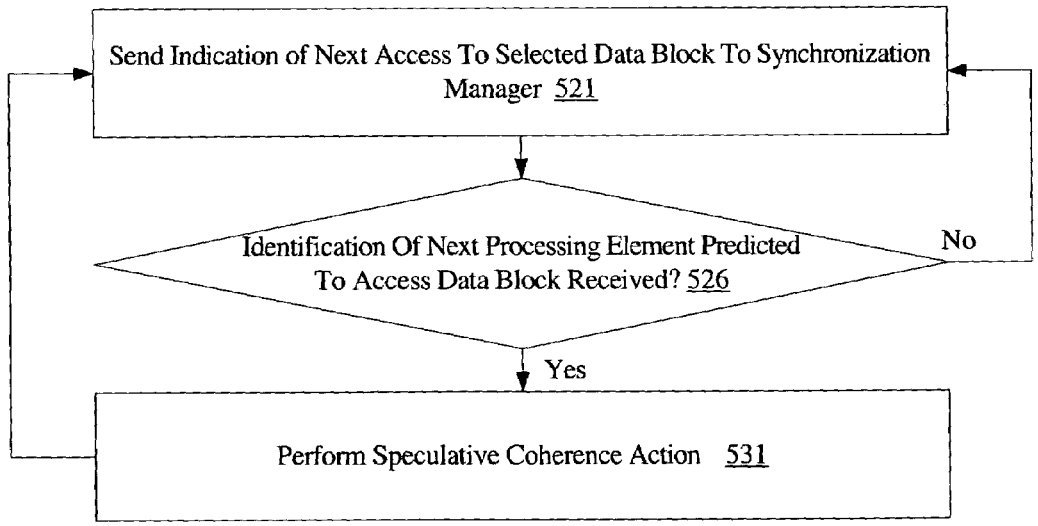
FIG. 5b is a flow diagram illustrating aspects of the operation of a processing element, according to one embodiment.

FIG. 5b is a flow diagram illustrating aspects of the operation of a particular processing element 120, according to one embodiment. As noted earlier, an indication of an access to a next selected data block may be provided to the synchronization manager 160 from the particular processing element 120 (block 521 of FIG. 5b). Upon receiving the indication, if a sequence entry 215 for the next data block exists, synchronization manager 160 may be able to predict the identity of the next processing element that will access the data block, and may send an identification of the next processing element back to the particular processing element, as described above in conjunction with the description of FIG. 4a. If the particular processing element receives such an identification (as detected in block 526 of FIG. 5b), the processing element 120 may initiate and perform one or more speculative coherence actions (block 531). The speculative coherence action may include a number of different types of operations in different embodiments, including, for example, sending the modified version of the selected data block to the cache 130 of the next processing element 120, sending modified versions of all the data blocks modified during the execution of a current critical section to the next processing element's cache, etc. In some embodiments, synchronization manager 160 may not send an identification of a next processing element, for example if the next processing element identified in the sequence entry 215 is the same as the particular processing element where the data block is currently being accessed. In other embodiments, synchronization manager 160 may be configured to always send an identification of a next processing element, even if the next processing element is the same as the current processing element, and the identification may be ignored if the next processing element happens to be the same as the current processing element.

If no speculative coherence action is initiated, or after the speculative coherence actions have been begun, processing element 120 may continue normal execution, and interact with the synchronization manager whenever a next selected data block is accessed—i.e., processing element 120 may repeat the operations corresponding to blocks 521, 526 and 531. In some embodiments, some of the speculative coherence actions may be performed in parallel with succeeding operations, so that, for example, processing element 120 may send a message to synchronization manager 160 indicating a next access to another selected data block while speculative coherence actions for the current data block are still in progress. That is, the operations corresponding to blocks 521 and 531 of FIG. 5b may be performed in parallel in some embodiments.

Figure 6:
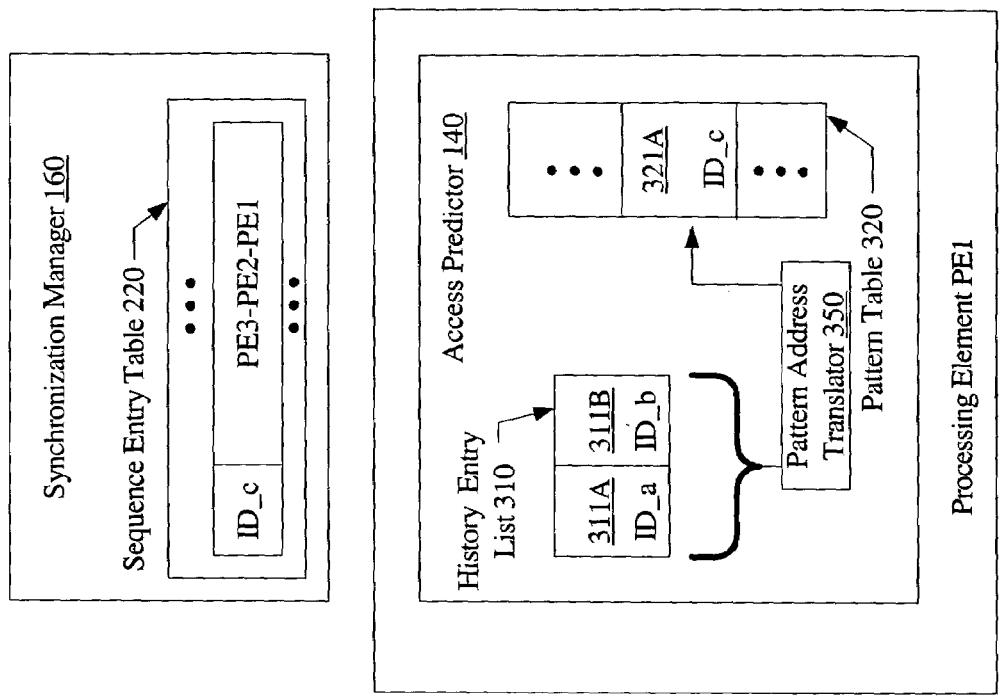
FIG. 6 is a block diagram illustrating an exemplary sequence of accesses to a set of selected data blocks from three processing elements, according to one embodiment.
Figure 6:
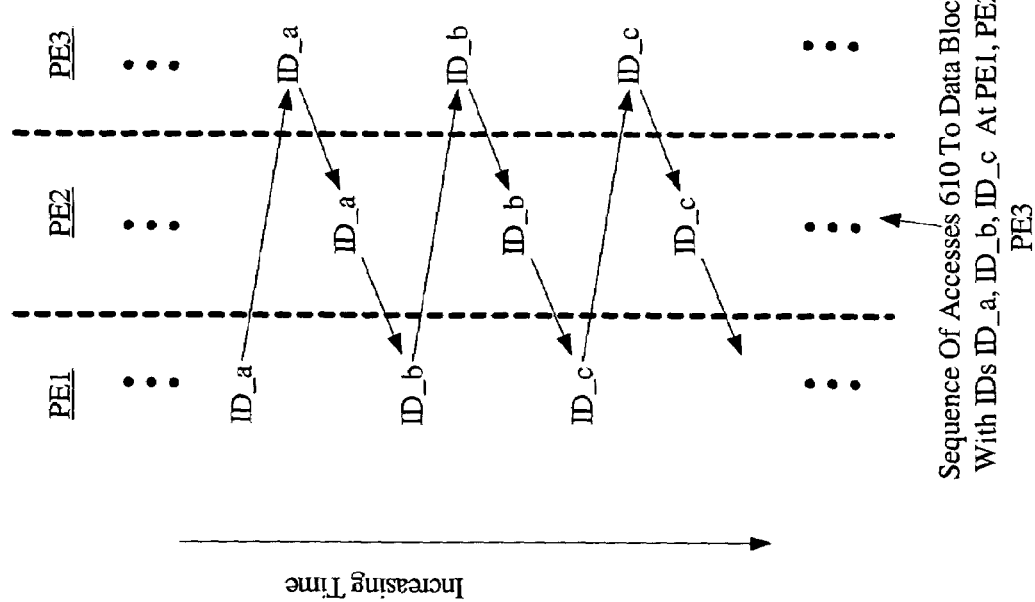

FIG. 6 is a block diagram illustrating an exemplary sequence of accesses to a set of selected data blocks from three processing elements, according to one embodiment. A sequence of accesses 610 is shown at the left of FIG. 6, illustrating an example of an order in which three processing elements PE1, PE2 and PE3 access three selected shared data blocks ID_a, ID_b, and ID_c. Each column of accesses 610 corresponds to a particular processing element, and the relative time at which the data blocks are accessed increases from the top to the bottom of the illustrated sequence. Each processing element accesses the three data blocks in the sequence ID_a, followed by ID_b, followed by ID_c. Further, after PE1 accesses ID_a, PE3 accesses ID_a, and after PE3 accesses ID_a, PE2 accesses ID_a. Similarly, after PE1 accesses ID_b, PE3 and then PE2 access ID_b; and accesses to ID_C also occur in the sequence (PE1, PE3, PE2). The pattern of accesses to the shared selected data blocks may be repeated, both for a given processing element and across the multiple processing elements. When a particular processing element accesses a selected data block, an indication of the access is provided to synchronization manager 160, which sends a globally unique identifier corresponding to the data block to a corresponding access predictor 140 as described previously.

The access predictor 140 (such as the illustrated access predictor 140A corresponding to processing element PE1) updates its history entry list 310 and/or pattern table 320 using the identifier, and if sufficient entries are present in the history entry table 310, sends a prediction of the next data block that will be accessed. For example, access predictor 140A may maintain the two entries 311A and 311B containing ID_a and ID_b at the point of time illustrated in FIG. 6. The contents of the history entry 310 as shown may be used to identify pattern table entry 321A (e.g., via pattern address translator list 350) which predicts that the next data block that PE1 will access is ID_c. Access predictor 140A may send the prediction identifying ID_c to synchronization manager 160. On receiving the prediction, synchronization manager 160 may search for a sequence entry 215 for ID_c in sequence entry table 220. As shown, such a sequence entry may be found. Synchronization manager 160 may add PE1 to the sequence and may be able to predict that PE3 will be the next processing element that will access ID_c. Based on this prediction, synchronization manager 160 may send an identification of the next processing element to processing element PE1. On receiving the identification, PE1 may initiate a speculative coherence action, such as sending contents of the data block ID_c to PE3's cache after it is updated by PE1.

It is noted that while the embodiments described above and depicted in FIG. 1 have included a single synchronization manager 160, multiple synchronization managers may be employed in other embodiments. For example, in one embodiment, sequence entries 215 for different subsets of a given address space may be managed at different synchronization managers. In such an embodiment, a modulo-based function or some other mapping based on data block address may be used to identify the particular synchronization manager responsible for maintaining the sequence entry for a particular data block. For example, just as each data block in a distributed shared memory system has a "home node", each selected data block may also have a "home synchronization manager". In multiprocessor systems with a large number of processing elements 120 and/or a large number of shared data blocks whose accesses are likely to result in coherence operations, such a division of synchronization manager functions may also help to avoid bottlenecks that may otherwise be caused by excessive interactions with a single synchronization manager.

It is also noted that while several techniques that may be used to identify the selected set of data blocks for which sequence entries 215 may need to be maintained have been described above, other methods of identifying data blocks that may lead to excessive coherency-related operations may be employed in some embodiments. In addition, in some embodiments, sequence entries 215 may be maintained for all updated data blocks rather than for a selected subset. In one embodiment, a synchronization manager may be initially configured to maintain sequence entries for all data blocks for which predictions are received from access predictors 140, and may also be configured to dynamically discard sequence entries that are determined to provide inaccurate predictions or that do not represent data blocks that move frequently from one cache to another. In such embodiments, synchronization manager 160 may be configured to dynamically adapt to observed data access behavior from different processing elements by modifying and/or discarding entries from sequence entry table 210. In some embodiments, functionality generally similar to that of synchronization manager 160 and/or access predictors 140 may be implemented using firmware and/or software.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A coherence prediction mechanism for a multiprocessor computer system, comprising:
   a synchronization manager configured to maintain one or more sequence entries, wherein each sequence entry of the one or more sequence entries is associated with a corresponding data block of a set of selected data blocks, wherein the sequence entry for a particular data block is indicative of a sequence in which the particular data block is accessed by two or more processing elements of the multiprocessor computer system; and
   a plurality of access predictors, including a first access predictor, wherein each access predictor is associated with a corresponding processing element of the multiprocessor system,
   wherein the first access predictor is configured to provide a prediction identifying a next data block of the set of selected data blocks to be accessed by the corresponding first processing element to the synchronization manager.

2. The coherence prediction mechanism as recited in claim 1, wherein, in response to the prediction, the synchronization manager is configured to add an identification of the first processing element to a sequence entry corresponding to the next data block.

3. The coherence prediction mechanism as recited in claim 1, wherein, in response to an indication of an access to a first data block of the set of selected data blocks from the first processing element, the synchronization manager is configured to identify a second processing element of the two or more processing elements predicted to access the first data block next, and send a notification to the first processing element including an identification of the second processing element.

4. The coherence prediction mechanism as recited in claim 3, wherein, in response to the notification, the first processing element is configured to initiate a speculative coherence action.

5. The coherence prediction mechanism as recited in claim 4, wherein the speculative coherence action includes sending modifications made to the first data block to a cache at the second processing element.

6. The coherence prediction mechanism as recited in claim 1, wherein the first access predictor is configured to maintain a plurality of history entries associated with the first processing element indicative of a sequence in which two or more data blocks of the set of selected data blocks were accessed by the first processing element.

7. The coherence prediction mechanism as recited in claim 6, wherein the first access predictor is further configured to:
   maintain a pattern table including a plurality of pattern table entries, wherein each pattern table entry includes an identification of a corresponding data block of the set of selected data blocks;
   access a particular pattern table entry from the pattern table using an address dependent upon contents of at least one history entry of the plurality of history entries; and
   identify the data block corresponding to the particular pattern table entry as the next data block in the prediction.

8. The coherence prediction mechanism as recited in claim 1, wherein at least one data block of the set of selected data blocks corresponds to a synchronization variable modified during a critical section.

9. The coherence prediction mechanism as recited in claim 1, wherein a detection of a read-modify-write operation on a particular data block is used to identify the particular data block as belonging to the set of selected data blocks.

10. The coherence prediction mechanism as recited in claim 1, wherein the first processing element is a processor core on a multi-core processor chip.

11. The coherence prediction mechanism as recited in claim 1, wherein at least one processing element of the multiprocessor system is a multi-threaded processor core operable to support multiple threads of execution, and wherein a respective access predictor is associated with each of the multiple threads.

12. A system, comprising:
    a plurality of processing elements;
    a synchronization manager; and
    a plurality of access predictors, including a first access predictor associated with a first processing element of the plurality of processing elements;
    wherein the synchronization manager is configured to maintain one or more sequence entries, wherein each sequence entry of the one or more sequence entries is associated with a corresponding data block of a set of selected data blocks, wherein the sequence entry for a particular data block is indicative of a sequence in which the particular data block is accessed by two or more processing elements of the plurality of processing elements;
    wherein the first access predictor is configured to provide a prediction identifying a next data block of the set of selected data blocks to be accessed by the first processing element to the synchronization manager.

13. The system as recited in claim 12, wherein, in response to the prediction, the synchronization manager is configured to add an identification of the first processing element to a sequence entry corresponding to the next data block.

14. The system as recited in claim 12, wherein, in response to an indication of an access to a first data block of the set of selected data blocks from the first processing element, the synchronization manager is configured to identify a second processing element of the two or more processing elements predicted to access the first data block next, and send a notification to the first processing element including an identification of the second processing element.

15. The system as recited in claim 14, wherein, in response to the notification, the first processing element is configured to initiate a speculative coherence action.

16. The system as recited in claim 15, wherein the speculative coherence action includes sending modifications made to the first data block to a cache at the second processing element.

17. The system as recited in claim 12, wherein the first access predictor is configured to maintain a plurality of history entries associated with the first processing element indicative of a sequence in which two or more data blocks of the set of selected data blocks were accessed by the first processing element.

18. The system as recited in claim 17, wherein the first access predictor is further configured to:
  maintain a pattern table including a plurality of pattern table entries, wherein each pattern table entry includes an identification of a corresponding data block of the set of selected data blocks;
  access a particular pattern table entry from the pattern table using an address dependent upon contents of at least one history entry of the plurality of history entries; and
  identify the data block corresponding to the particular pattern table entry as the next data block in the prediction.

19. The system as recited in claim 12, wherein at least one data block of the set of selected data blocks corresponds to a synchronization variable modified during a critical section.

20. The system as recited in claim 12, wherein a detection of a read-modify-write operation on a particular data block is used to identify the particular data block as belonging to the set of selected data blocks.

21. The system as recited in claim 12, wherein the first processing element is a processor core on a multi-core processor chip.

22. The system as recited in claim 12, wherein at least one processing element of the multiprocessor system is a multi-threaded processor core operable to support multiple threads of execution, and wherein a respective access predictor is associated with each of the multiple threads.

23. A method, comprising:
  maintaining a plurality of sequence entries, wherein each sequence entry of the plurality of sequence entries is associated with a corresponding data block of a set of selected data blocks, and is indicative of a sequence in which the corresponding data block is accessed by two or more processing elements of a multiprocessor computer system;
  obtaining an indication of an access to a first data block of the set of selected data blocks from a first processing element of the two or more processing elements;
  using the sequence entry associated with the first data block to identify a second processing element of the two or more processing elements predicted to access the first data block next; and
  sending a notification to the first processing element including an identification of the second processing element.

24. The method as recited in claim 23, further comprising:
  initiating a speculative coherence action based on the identification of the second processing element.

25. The method as recited in claim 24, wherein the speculative coherence action includes sending modifications made to the first data block to a cache at the second processing element.

* * * * *

UNITED STATES PATENT AND TRADEMARK OFFICE
CERTIFICATE OF CORRECTION

PATENT NO. : 7,363,435 B1
APPLICATION NO. : 11/116028
DATED : April 22, 2008
INVENTOR(S) : Stenstrom It is certified that error appears in the above-identified patent and that said Letters Patent is hereby corrected as shown below:

Page 1

Item (75) Inventor: please delete "Gothenburg" and substitute --Goteborg.--

Signed and Sealed this

Fifth Day of August, 2008

JON W. DUDAS
*Director of the United States Patent and Trademark Office*